March 10, 1959 E. J. SCHAEFER 2,877,068
BEARING ASSEMBLY
Filed April 16, 1957
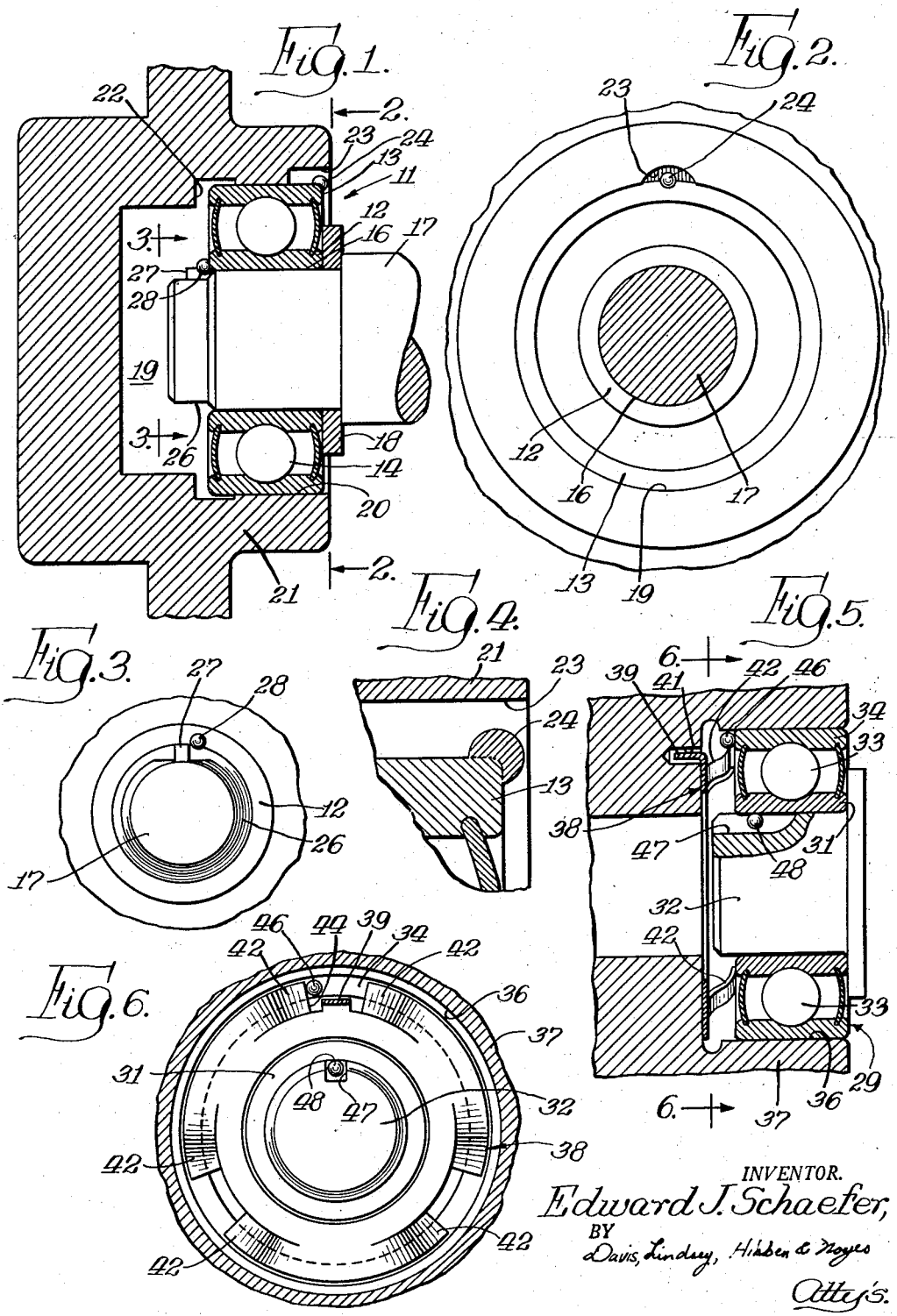
INVENTOR.
Edward J. Schaefer,
BY
Davis, Lindsey, Hibben & Noyes
Atty's.

United States Patent Office 2,877,068
Patented Mar. 10, 1959

2,877,068

BEARING ASSEMBLY

Edward J. Schaefer, Fort Wayne, Ind.

Application April 16, 1957, Serial No. 653,093

11 Claims. (Cl. 308—236)

This invention relates to bearing mountings and more particularly to an improved bearing assembly for relatively rotating members.

Anti-friction bearings of the type that include ball and roller bearings generally comprise inner and outer bearing races with anti-friction bearing elements, such as balls or rollers, interposed therebetween. The inner race is usually mounted on a seat on a shaft, while the outer race is usually mounted in a seat in a housing, or the like.

Generally speaking, it is desirable that no relative rotation occur between the races and their respective seats on the associated members, because such relative rotation results in undue wear and early failure of the bearing. It has become common practice to rigidly mount, as by a press fit, one of the bearing races with respect to its associated seat in order to reduce such wear. However, in some instances it is desirable to loosely mount the other race, especially when relatively long shafts are involved, so that relatively longitudinal movement, i. e. linear movement parallel to the axis of rotation of the shaft, may occur between the seat and its associated race, in order to accommodate expansion and contraction of the shaft, or for other reasons.

Heretofore a number of proposals have been made for preventing rotation of a bearing race relative to its associated member when relative longitudinal or axial movement is to be permitted. For example, my copending application Serial No. 337,271, filed February 17, 1953, now Patent No. 2,837,382, discloses a snubbing device for restraining rotation of the outer race of a ball bearing or the like with respect to its housing but permitting axial movement therebetween. In addition, a number of other devices have been proposed for effecting similar results with respecct to the races of bearings. However, the devices heretofore proposed have been objectionable either because they do not effectively prevent undesired relative rotation, or because they interfere with free axial movement, or because they require a complex modification of the bearing or housing structure or both.

Accordingly it is a primary object of this innvention to provide a novel and simplified bearing assembly which overcomes the above enumerated difficulties that have been encountered in other assemblies heretofore provided for preventing relative rotation between the races of bearings and their seats, while permitting relative axial movement.

Another object of the invention is to provide an improved bearing assembly which positively prevents rotation of one of the bearing races relative to its associated contacting member, but which at the same time freely permits limited relative axial movement therebetween.

A further object of the invention is to provide a novel bearing assembly that accomplishes the foregoing objects and which utilizes standard bearing components.

Other objects and advantages of the invention will become apparent from the subsequent detailed description taken in conjunction with the accompanying drawing, wherein:

Fig. 1 is a longitudinal sectional view of a ball bearing assembly embodying the features of this invention.

Fig. 2 is a sectional view taken on the line 2—2 of Fig. 1.

Fig. 3 is a fragmentary view of part of the assembly shown in Fig. 1 as seen along line 3—3;

Fig. 4 is a fragmentary portion of the structure shown in Fig. 1 on an enlarged scale;

Fig. 5 is a fragmentary cross-sectional view of a second form of bearing assembly embodying the features of the invention; and Fig. 6 is a sectional view taken on the line 6—6 of Fig. 5.

Broadly speaking, the objects of the invention are accomplished by providing at least one of the relatively rotatable members with an abutment means or stop and by providing the race associated with that member with a bead that projects therefrom so that it is positively engageable with the stop to prevent relative rotation therebetween. The surface of the bead that engages the stop is spherical and, therefore, sliding friction therebetween is held at a minimum so that free longitudinal movement therebetween is not hampered.

Referring to Fig. 1 of the drawing, the invention is illustrated in connection with a common form of shaft-journal assembly utilized, for example, in an electric motor. The assembly includes a common type of ball bearing shown generally at 11, comprising an inner race 12, an outer race 13 and a plurality of anti-friction bearing elements, such as the balls 14, disposed therebetween. The inner race 12 is mounted on a seat 16 on a shaft, shown fragmentarily at 17. One edge of the inner face 12 is shown as abutting against a circumferential collar or ring 18 engaging a shoulder formed on the shaft 17. The outer race 13 is disposed within a circular recess 19 in a seat 20 in a journal housing 21.

In order to accommodate relative axial movement of the bearing 11 with respect to the journal housing 21 as the motor shaft expands and contracts from the heating and cooling of the motor, sufficient clearance is provided between the side of the bearing 11 and a circumferential shoulder 22 in the recess 10. Obviously, for such axial movement to occur, the outer race 13 must be in relatively loose contact with the seat 20. However, a loose fit would necessarily allow the outer race to rotate relative to the housing member 21 unless means were provided to prevent it. Likewise, in some situations it may be desirable that the inner race 12 be axially movable relative to the shaft 17. In such case, the inner race 12 is dimensioned to loosely engage the seat 16, and again, such engagement would permit the harmful and undesirable relative rotation between the inner race 12 and the seat 16.

The outer bearing race and its associated journal housing 21, shown in Figs. 1 and 2, illustrate a preferred embodiment of the invention that prevents relative rotation therebetween without interferring to any marked degree with relative axial movement therebetween. In this instance the housing 21 is provided with a short slot or key way 23 that extends parallel to the axis of rotation of shaft 17. The outer race 13 is provided with a bead 24 having a generally spherical surface that projects into the key way or slot 23 and is engageable with the housing therein. Preferably the bead 24 is a small ball secured to the outer race 13 in a manner to be hereinafter described, and in this instance it is disposed at a corner of the race formed by the peripheral surface and a side edge thereof. The spherical surface of the ball provides a minimum area of contact with the housing 21 in the key way so that friction is minimized and thus will not impede axial movement of the race relative to the housing. The abutment of the ball against the housing 21 in the slot 23, however, effectively prevents relative rotation therebetween.

Although the slot or key way 23 may have any desired cross sectional shape, in the present instance it is shown as being curved in cross section to simplify manufacture. The key way 23 is sufficiently large to provide ample clearance around the bead 24. Although the clearance provided in this case does permit a slight amount of relative rotation between the race and the housing upon a change of direction of rotation of the shaft, the amount of rotation is so small that no harmful effects will result.

The inner race 12 and the shaft 17, including the seat 16, shown in Figs. 1 and 3, illustrate a preferred embodiment of the invention for permitting relative axial movement therebetween. In this case the end portion 26 of the shaft 17 adjacent the seat 16 has a diameter that is somewhat less than that of the seat 16. The end portion 26 is provided with a radially projecting stop or lug 27 that extends approximately to a point in line with the surface of the portion 16, i. e. the radial height of the lug is less than the radius of the bore of the inner race. The lug or projection 27 can be conveniently formed by pinching up a part of the portion 26, as by a pressing operation. The inner race 12 is provided with a bead 28 having a generally spherical surface projecting therefrom for engagement with the lug 27 upon relative rotation between the shaft and the inner race in either direction. As in the case of the bead 24, the spherical surface of the bead 28 provides a minimum area of contact with the lug 27 to keep frictional resistance at a minimum, and on engagement with the lug 27, it positively prevents relative rotation between the inner race 12 and the shaft 17. The use of a lug such as 27 in this environment simplifies the assembly of the shaft with the bearing, because alignment difficulties are avoided.

Fig. 4 illustrates, on an enlarged scale, a fragment of the assembly shown in Fig. 1 and the manner of mounting the bead 24 on race 13. One of the primary features of this invention flows from the fact that the bearing races of standard bearings may be modified to practice the invention without the necessity of complicated machining and without the possibility of injury to the bearing races. Although beads of various types can be used, the most convenient way of providing a bead of the character herein contemplated is by spot-welding a small ball to the race. The illustrative example in Fig. 4 shows, in section, the ball 24 as it would appear when welded to the corner of the outer race 13. Inasmuch as the ball 24 is quite small, relatively speaking, a low voltage high current spot or resistance welding operation may be used to effect the weld. Because of the smallness of the ball, the welding operation is accomplished by a current flow of such short duration that neither annealing of the race nor distortion of the race will occur. Although some distortion of the bead occurs as it is welded to the race, the projecting surface retains its generally spherical character. As suggested above, beads other than balls might also be provided, but I have found that balls are most easily magazined in the welding apparatus and are best adapted for mass production purposes.

Figs. 5 and 6 illustrate a ball bearing of the general type shown in Fig. 1, but differing in detail construction. The bearing 29, like the bearing 11, has an inner race 31 that is mounted on a seat on the end of a shaft 32, a plurality of antifriction ball bearings 33, and an outer race 34 that is disposed in a circular recess in a seat 36 in a journal housing 37. In this instance, a bearing loading spring, shown generally at 38, is disposed between the end wall of the recess and the bearing 29. The spring 38 is rotatively fixed relative to the housing 37 by means of a finger or lug 39 that engages the housing 37 in an opening 41 therein. The loading spring 38 includes a plurality of spring arms or tabs 42 that engage the side of the bearing 29 at the edge of the race 34. The spring tabs or arms 42 yieldably urge the bearing axially outwardly with respect to the recess when the shaft 32 contracts, but they may be deflected inwardly to accommodate the bearing upon expansion of the shaft 32.

As shown in Fig. 6, adjacent tabs 42 have radially extending spaces or slots therebetween and thus each presents a radially extending edge, such as 44, at an edge of the outer race 34. To prevent relative rotation between the outer race 34 and the bearing loading spring 38, and hence the housing 37, the outer race 34 is provided with a bead 46, similar to those previously described, positioned on the side or edge of the race for engagement with one of the radially extending edges of a finger 42, such as the edge 44, upon relative rotation therebetween. Thereafter, further relative rotation is positively prevented, as before described.

To prevent relative rotation between inner race 31 and the shaft 32, in this instance, the shaft 32 is provided with a relatively short slot or key way 47 that extends parallel to the axis rotation of the shaft 32. The inner race 31 is provided with a bead 48, which in this instance projects into the bore of the race and engages the shaft 32 in the slot or key way 47. The bead and shaft cooperate to prevent relative rotation therebetween in the same manner as in the preceding instances.

From the foregoing it is seen that this invention solves the problem of preventing relative rotation between a bearing race and its associated contacting member without adversely affecting relative axial movement therebetween. Furthermore, the structural changes necessary to carry the invention into effect may be cheaply and easily made.

Although the invention has been described in connection with certain specific structural embodiments, it is to be understood that various modifications and equivalent structures may be resorted to without departing from the scope of the invention as defined in the appended claims.

I claim:

1. In combination, a bearing having an inner race and an outer race, a housing member carrying said outer race, and a shaft member carrying said inner race, at least one of said members having stop means, the race carried by said one member having a bead fixed relative thereto, said bead having a surface projecting therefrom, said surface being engageable with said stop means whereby relative rotation between said one member and its associated race is prevented, said surface being generally spherical to provide a minimum area of contact with said abutment means to permit said associated race to freely move axially relative to said one member.

2. The combination according to claim 1 in which said bead comprises a ball welded to a surface of the said associated race.

3. The combination according to claim 1 in which said bead comprises a ball welded to the said associated race on a corner at the juncture of a side edge and the peripheral surface thereof.

4. In combination, a bearing having an inner race and an outer race, a housing member carrying said outer race, and a shaft member carrying said inner race, at least one of said members having a key way extending parallel to the axis of rotation of said shaft, the race carried by said one member having a bead fixed thereto, said bead having a surface projecting therefrom into said key way, said surface being engageable with the said one member upon relative rotation between said one member and its associated race whereby further relative rotation between said one member and its associated race is prevented, said surface being generally spherical to provide a minimum area of contact with said one member to permit said associated race to freely move axially relative to said one member.

5. In combination, a housing member having a recessed bearing seat therein, a shaft member having a bearing seat thereon, a bearing having an outer race disposed in said recessed seat and an inner race disposed on the seat on said shaft member, at least one of said members having a key way cut into its said seat, said key way extending parallel to the axis of rotation of said shaft, the race associated with said one member having a bead fixed thereto, said bead having a surface projecting therefrom into said key way, said surface being engageable with said one member upon relative rotation between said one member and its associated race whereby further relative rotation therebetween is prevented, said surface being generally spherical to provide a minimum area of contact with said one member to permit said associated race to freely move axially on its seat.

6. The combination according to claim 5 in which said key way is in said housing member and said bead comprises a ball welded to a corner of said outer race to project radially outwardly therefrom.

7. The combination according to claim 5 in which said shaft member has said key way and said bead comprises a ball welded in the inner surface of said inner race to project inwardly therefrom.

8. In combination, a housing member having a circular recess providing a recessed bearing seat, a bearing having an outer race loosely disposed in said seat, and a bearing loading spring disposed in said recess for urging said bearing axially outward therefrom, said spring being rotatively fixed to said housing member and having a plurality of arms in contact with an end edge of said outer race, said outer race having a ball welded to said edge of said outer race and projecting therefrom, said ball engaging one of said arms upon relative rotation between said outer race and said spring whereby further relative rotation therebetween is prevented.

9. In combination, a shaft member having a bearing seat thereon, a bearing having an inner race disposed on said seat, said shaft including a portion of reduced diameter adjacent said seat and an axially extending lug projecting radially outward from the surface of said portion, said inner race having a ball welded to a corner thereof to project radially inwardly relative to said shaft member and to the side of said race for engagement with said lug, said ball engaging said lug upon rotation of said shaft member relative to said inner race whereby further relative rotation therebetween is prevented, said ball providing a minimum area of contact with said lug to permit said race to freely move axially relative to said shaft member.

10. The combination according to claim 1, in which said stop means comprises abutment surfaces rotatively fixed relative to said one member.

11. The combination of claim 10, in which said abutment surfaces are located circumferentially on opposite sides of said bead and are engageable thereby.

References Cited in the file of this patent

UNITED STATES PATENTS 2,581,173    Crankshaw _____ Jan. 1, 1952